PARKER & KELLISON.
Corn-Planter.
No. 69,836.
Patented Oct. 15, 1867.
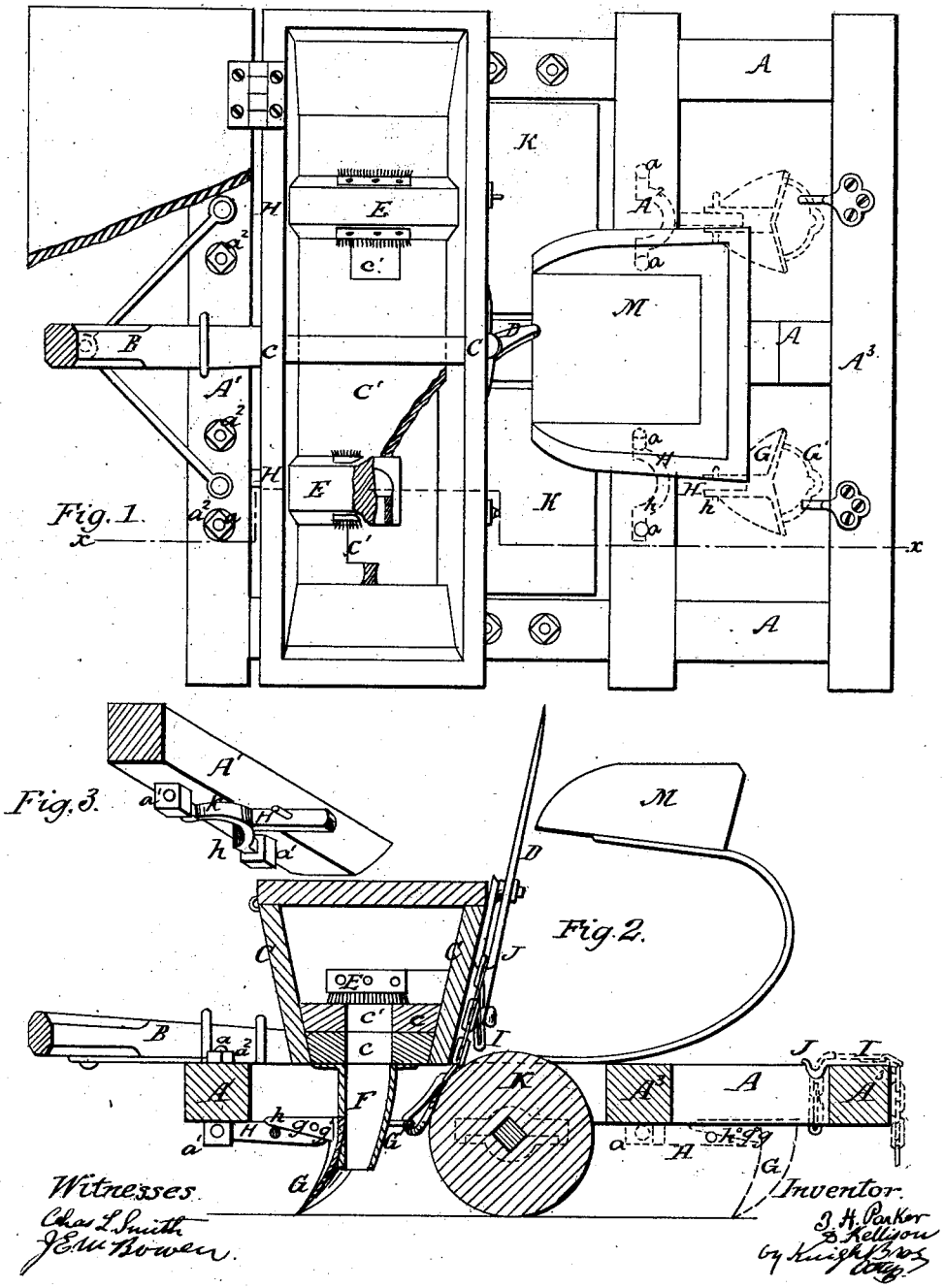
Witnesses
Chas L Smith
J E M Bowen
Inventor
J. H. Parker
B. Kellison
by Knight Bros
Attys

United States Patent Office.

THOMAS H. PARKER AND DANIEL KELLISON, OF PARKERSBURG, ILLINOIS.

*Letters Patent No. 69,836, dated October 15, 1867.*

IMPROVEMENT IN CORN-PLANTER.

*The Schedule referred to in these Letters Patent and making part of the same.*

TO ALL WHOM IT MAY CONCERN:

Be it known that we, THOMAS H. PARKER and DANIEL KELLISON, of Parkersburg, Richland county, State of Illinois, have invented a new and improved Corn-Planter; and we do hereby declare that the following is a full, clear, and exact description thereof, which will enable others skilled in the art to make and use the same, reference being had to the accompanying drawings, forming part of this specification.

This invention relates to a corn-planter, consisting of a simple rectangular frame, upon which the seed-hopper and driver's seat are mounted, and which is supported upon the rollers which serve to cover the seed and break the clods, and provided with conducting-tubes and marking-shovels, and a draught-tongue for the attachment of a team.

The improvement consists in a provision for transferring the shovels from the front to the rear of the rollers, or vice versa, so that they may be made to operate in conjunction with the seeding apparatus and rollers to form drills for the grain, and cover the same, or in conjunction with the rollers alone to roll and mark off the earth.

Figure 1 is a plan of a corn-planter illustrating our invention.
Figure 2 is a vertical section of the same in the plane indicated by the line $xx$, fig. 1.
Figure 3 is a detached view, hereinafter referred to.
The same parts are indicated by the same letters in the different figures.

A $A^1$ $A^2$ $A^3$ represent a frame, the several parts of which may be joined together by mortise-and-tenon joints. B is the draught-tongue, attached to the front end of the frame, and braced in any suitable manner. M is the driver's seat. C is a hopper, mounted upon and near the forward end of the frame, and provided with a slide, C', the openings c' of which are brought in communication with and retracted from the corresponding openings c in the bottom of the hopper as said slide is reciprocated within the latter by means of the pivoted lever D, which is operated by hand. The superfluous grain is brushed back by the stationary brushes E, and as the slide is reciprocated a modicum of grain is deposited at regular intervals, and the tubes F F discharge the grain into the drills made by the shovels G G. Between the two parts of the shank g of each shovel G a forked arm, H, is secured by a pivot, g', and the shovel is maintained in its working position by the breakable pin h, which, passing through the arm H, sustains the free extremity of the shank g, as seen in fig. 2. Fig. 3 clearly illustrates the method of attaching the arms H to the foremost transverse beam A of the frame. The heads $a^1$ on the lower ends of the bolts a are formed with eyes, which receive the extremities of the branching parts h' h' of the arm H, and the bolts are secured in the beam $A^1$ by the nuts $a^2$. Each shovel G is sustained at the proper height by means of the bow G' and chain I, the chain being connected to the bow (which is made fast to the shovel) by means of a snap-hook or otherwise, and hitched to a hook, J, secured to the back of the hopper. K K represent rollers journalled in suitable bearings attached to the beams of the frame, and so situated as to follow the respective drill-tubes F. When the parts are disposed in relation to each other, as shown in fig. 2, the shovels G open the drills for the reception of the grain, and the rollers K cover and press the earth upon the grain.

The machine may be adapted for rolling and marking off the ground without planting, by transferring the shovels G G behind the rollers K K. For this purpose the beam $A^2$ is provided with apertures for the reception of the bolts a, and hooks J' are attached to the rear beam $A^3$ for the hitching of the chain I, as shown in red lines, figs. 1 and 2.

Having thus described the nature of our invention, what we claim as new, and desire to secure by Letters Patent, is—

1. The combination with the shovel G g' of the arm H, bolts a, and chain I, whereby said shovel is made transferable, substantially as and for the purpose set forth.

2. The combination of the frame A $A^1$ $A^2$ $A^3$, hopper C and its appurtenances, rollers K K, hooks J J', lever D, conducting-tubes F, and shovels G, with their accessories G g H a I, all arranged and operating substantially as herein described and represented.

To the above specifications of a newly invented and improved corn-planter we have this day signed our names and affixed our private seals.

THOMAS H. PARKER, [L. S.]
DANIEL KELLISON, [L. S.]

Witnesses:
F. D. PRESTON,
W. T. SHELBY.